Oct. 4, 1949.  A. M. REID  2,483,669
TOAST-MARKING ELECTRIC HEATING ASSEMBLY
Filed Dec. 15, 1945  2 Sheets-Sheet 1

Inventor
Andrew Marshall Reid
by Parker & Carter
Attorneys

Oct. 4, 1949.   A. M. REID   2,483,669
TOAST-MARKING ELECTRIC HEATING ASSEMBLY
Filed Dec. 15, 1945   2 Sheets-Sheet 2

Inventor
Andrew Marshall Reid
by Parker + Carter
Attorneys

Patented Oct. 4, 1949

2,483,669

UNITED STATES PATENT OFFICE 2,483,669

TOAST-MARKING ELECTRIC HEATING ASSEMBLY

Andrew Marshall Reid, Chicago, Ill.

Application December 15, 1945, Serial No. 635,368

2 Claims. (Cl. 219—19)

This invention relates to a method of toasting articles and to an apparatus for accomplishing the toasting. One object of the invention is to provide means and a method for toasting material so that the degree of toasting is varied in different areas.

Another object is to provide a means and a method for toasting which will produce designs or outlines on the article which is toasted.

Another object is to provide an ornamental or initialed piece of toast.

Other objects will appear from time to time throughout the specification and claims.

This invention is illustrated more or less diagrammatically in the accompanying drawings, wherein.

Like parts are indicated by like characters throughout the specification and the drawings.

In general the apparatus used in carrying out the method of this invention comprises means for overtoasting a portion of the area which is toasted. In that sense it provides means for toasting different areas to a different degree. It may also provide means for shielding a portion of the area to prevent its being toasted or to limit its degree of toasting. This is obviously another form of differential toasting. It may include also means for accomplishing overtoasting and for accomplishing shielding or undertoasting. This is a further modification of the general idea of accomplishing differential toasting.

Figure 2:
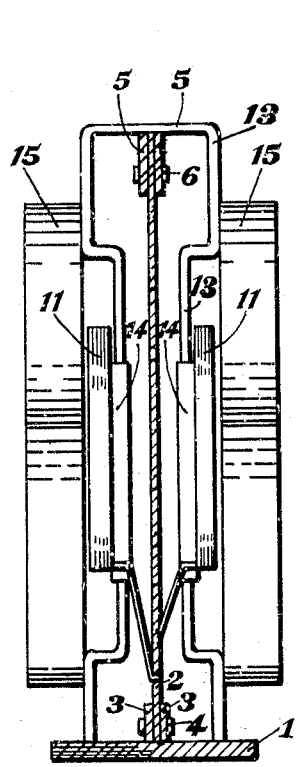
Figure 2 is a vertical section taken at line 2—2 of Figure 1.
Figure 1:
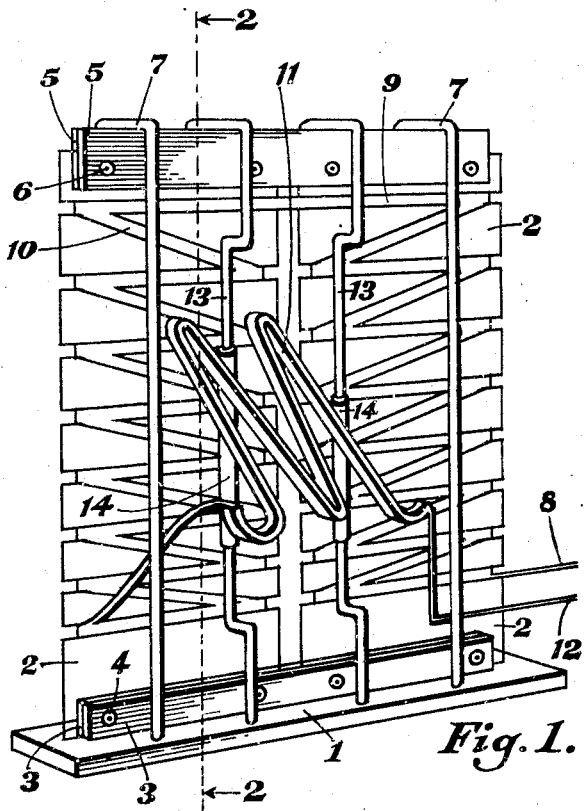
Figure 1 is a perspective view illustrating one form of apparatus for carrying out the method.

As shown in Figures 1 and 2, the device illustrated is merely the toaster element of a more or less conventional toaster device upon which a special design has been mounted to accomplish overtoasting of a limited area. As thus shown the device includes a base 1 with mica or other insulating members 2, 2 fixed to the base by members 3, 3 which are riveted or otherwise joined, as at 4, the members 3, if desired, being themselves fixed to the base.

At their tops the members 2 may be secured between retaining parts 5, 5 which are secured together by rivets 6. One or more frame members 7, 7 extend vertically and are secured to the base 1 and to the members 5 and thus serve to position the device. The members 2 may conveniently be formed of mica or other insulating material, as pointed out, and a heat element is positioned about these members.

As shown the heating member may comprise a lead-in member 8 which extends about the right-hand member 2, as shown in Figure 1, and crosses over, as at 9, and descends on the left-hand member 2, as at 10. The lead is connected to an initial 11 and from this initial a conductor 12 extends to the source of current to complete the circuit through the system. The initial 11 is supported on indented bars 13, 13 which are indented sufficiently to support the initial without increasing the over-all thickness of the heating assembly.

Insulating members 14 may be positioned about the indented members 13 and the initial 11 is secured to them and held in position without danger of short circuiting the system.

To illustrate the device in use, there have been shown diagrammatically in Figure 2 two pieces of bread 15, 15. It is to be understood that the heating assembly of Figures 1 and 2 is mounted within a frame or supporting assembly which surrounds and shields the heating element and furnishes positioning and supporting means for the bread or other article during toasting. No showing of the housing or casing is made, because such articles are well-known on the market and their details form no part of the present invention, which may be accomplished by any device suitable for containing and supporting the heating assembly and bread during toasting.

Figure 3:
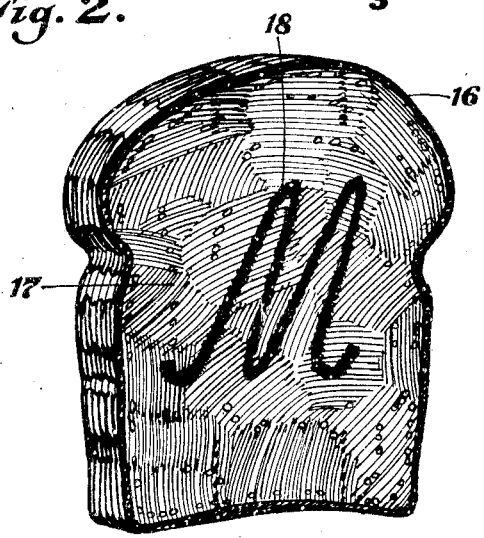
Figure 3 is a perspective view illustrating one form of toast as produced by the device of Figure 1.

The initial 11 is shown merely as illustrative of the fact that some design or member may be provided in addition to the normal heating element, and this design or member will produce heat of a greater degree than that which is produced by the parts 8, 9 and 10. Thus as shown in Figure 3, 16 is a piece of toast, the general surface of which has been toasted, as at 17, to produce a given degree of toasting, while the area 18 which corresponds to the initial 11, has been overtoasted or toasted to a degree greater than the major area 17.

Figure 4:
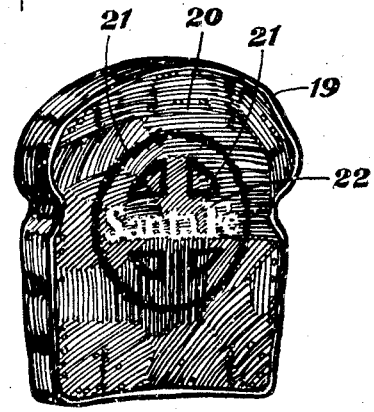
Figure 4 is a perspective on a reduced scale, illustrating a piece of toast of a modified design.

As shown in Figure 4, 19 is a piece of toast, the major portion of which has been toasted to a given degree as at 20. A design 21 formed of a circle and four approximately triangularly shaped members has been overtoasted and two words have been screened or masked to produce the lighter area indicated generally by the numeral 22. As thus shown in Figure 4, the piece of toast includes areas of three degrees of toasting— the main area 20, the overtoasted area 21 and the undertoasted area 22. Obviously any sort of design could be produced by the apparatus shown or by the obvious modification which produces the member as shown in Figure 4. One apparatus for producing undertoasting or for shielding or masking an area is illustrated in Figure 5.

Figure 6:
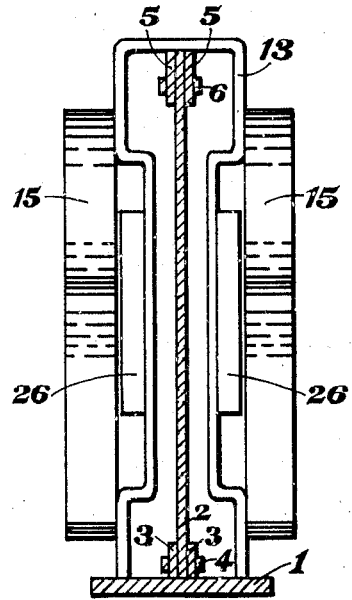
Figure 6 is a vertical section taken at line 6—6 of Figure 5.
Figure 5:
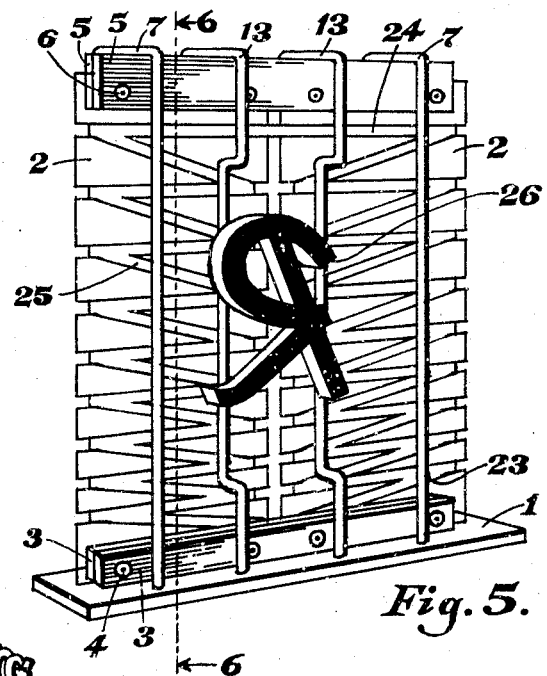
Figure 5 is a view similar to Figure 1, illustrating a modified form of the device.

As shown in Figure 5, the base 1 is the same as that described above in connection with Figures 1 and 2. The mica members 2 and the retaining members 3 and 4 are the same also. The U-shaped members 7 are as shown and described in connection with Figure 1, and the indented members 13 are also the same as shown and described in connection with Figure 1. The top retaining or positioning members 5 and 6 are the same. The main difference between the form of Figures 1 and 2 and the form of Figures 5 and 6 is that in Figures 5 and 6 means are provided for undertoasting or shielding a portion of the toast. Hence the initial or other design, instead of being heated to a greater degree of heat than the main element, is underheated, or at least heated to a lesser degree, than that to which the main element is heated.

There is thus a heating element 23 which extends upwardly about the right-hand mica member 2, crosses over as at 24 and joins the descending portion 25. Suitable connections are provided for this element but are omitted because such connections are well known in the art, and their details form no part of the present invention.

The design or initial 26 is positioned on the indented member 13 and it is of non-heated and preferably electrical and thermal insulating material. Whatever the material of the design or initial 26 its effect is to provide an area which is heated to a degree less than the main area.

Pieces of toast are indicated at 15 in Figure 6. Just as in the case of the device of Figures 1 and 2, a housing or enclosure is provided for the heating assembly and for positioning and retaining the toast. It is to be understood that a heating device or assembly of the sort shown generally in Figures 1, 2, 5 and 6 may be associated in a completed toaster with any of the well-known automatic control and ejecting devices.

Figure 9:
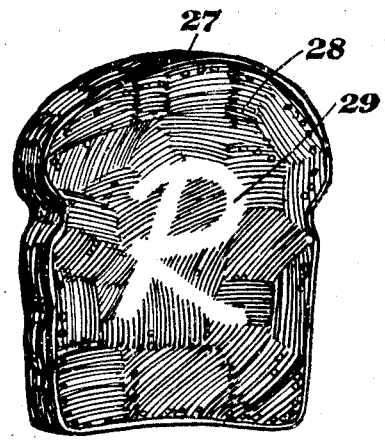
Figure 9 is a perspective view illustrating the toast produced by the structures of Figures 5 to 8, inclusive.

A piece of toast produced by the device of Figures 5 and 6 is illustrated in Figure 9. As there shown, 27 is a piece of toast which has been toasted to a given degree, as indicated at 28, and a design or initial 29 has been produced in the area 28 by the undertoasting or shielding caused by the member 26. The device of Figures 5 and 6 may be combined with the device of Figures 1 and 2 to produce a design such as that shown in Figure 4.

Figure 1 shows merely an overheating initial "M" and Figure 5 shows an underheating or shielding initial 26. Two such initials or two designs having the respective properties of overheating and underheating are combined to produce a design such as that shown in Figure 4. The invention is not therefore limited to mere overtoasting or mere undertoasting but may be carried out by undertoasting and overtoasting to a variety of different degrees to produce areas of differential toasting.

Figure 8:
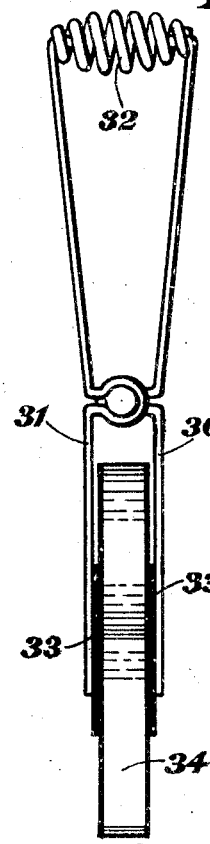
Figure 8 is an end view of Figure 7.
Figure 7:
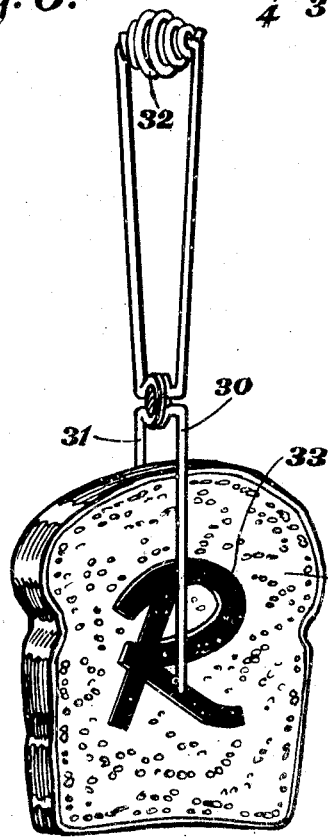
Figure 7 is a perspective view illustrating a further modified device for carrying out the process of the invention.

A simple form of apparatus for accomplishing the results illustrated in Figure 9 is shown in Figures 7 and 8, in which a holder provided with pivoted arms 30 and 31 is illustrated. These arms are pivoted and at their free ends are provided with a spring 32 which is biased to cause the arms adjacent the spring to move apart, and correspondingly to cause the arms adjacent their opposite ends to move together. As shown at these opposite ends, each arm has fixed to it an initial or design 33. For purposes of illustration the initial 33 is the same as the initial shown in Figures 5 and 6. In use this device is positioned on a piece of bread 34. As shown the bread has not yet been toasted, but the initials or designs 33 will act as shields to protect to a greater or less degree the area of the piece of bread beneath the members 33, and the design shown in Figure 9 will be produced on the completed piece of toast.

Although I have shown an operative form of my invention, it will be recognized that many changes in the form, shape and arrangement of parts can be made without departing from the spirit of the invention, and my showing is therefore to be taken as, in a sense, diagrammatic.

In particular, the device may be used for branding or marking almost any material. Its use is not limited to toasting edible foods. The shielding means of Figures 5 to 7 may completely prevent toasting, or it may merely accomplish a reduced degree of toasting.

The use and operation of this invention are as follows:

The device in the form of Figures 1 and 2 is assembled in a suitable housing and connected to a suitable source of electric current. When the heating elements are energized, a greater degree of heat and hence a greater degree of toasting is effected by the heating element, such as the member 11, which produces an initial or design of greater degree of toasting than the main area of the piece of toast 16.

The use of the device as shown in Figures 5 and 6 is the same as that just described, except that the initial or design produces a lesser area of toasting, and obviously two initials such as the members 11 and 26 might be combined, or any two elements productive of any desired design might be combined.

Whatever the heating elements, when they are mounted in a suitable frame and housing and energized, pieces of bread are put in place and are toasted according to the designs of the design elements. Upon completion they are removed and bear these designs. The produce of the method is therefore a piece of toast whose surface is toasted in areas of different degrees of intensity or color.

When used in connection with branding or marking materials other than toasting, the operation is generally that described above.

I claim:

1. In combination in a toasting device, a heating assembly including a support, an electric heating element positioned upon said support, electrical conductors connected to said heating element, and a member in circuit with said heating element, said member adapted, when it and the said heating element are heated by electrical energy, to become hotter than the said heating element, and toast positioning means, and means positioned to support said member, the toast positioning means and the said member being positioned substantially in the same plane.

2. In combination in a toasting device, a heating assembly including a support, an electrical heating element positioned upon said support, electrical conductors connected to said heating element, a toast positioning frame disposed in front of said electric heating element and including portions adapted to be engaged by toast to be maintained in predetermined spaced relation to said electric heating element, said frame including also a recessed portion, and a toast marking member positioned forward of said electric heating element and disposed within said recessed portion of said frame and connected in circuit with said heating element, said member adapted, when it and the said heating element are heated by electrical energy, to become hotter than the said heating element to mark the toast by toasting those areas thereof which are juxtaposed to said member to a darker hue than the more remote areas of the toast.

ANDREW MARSHALL REID.

REFERENCES CITED

The following references are of record in the file of this patent:

UNITED STATES PATENTS

| Number | Name | Date |
|---|---|---|
| 475,884 | Murrey | May 31, 1892 |
| 1,892,117 | Perkins | Dec. 27, 1932 |
| 2,356,649 | Bucher | Aug. 22, 1944 |